June 16, 1925.
M. A. ROLLMAN
1,542,322
COMBINATION FRUIT PRESS, POTATO MASHER, AND STRAINER
Original Filed Sept. 23, 1920
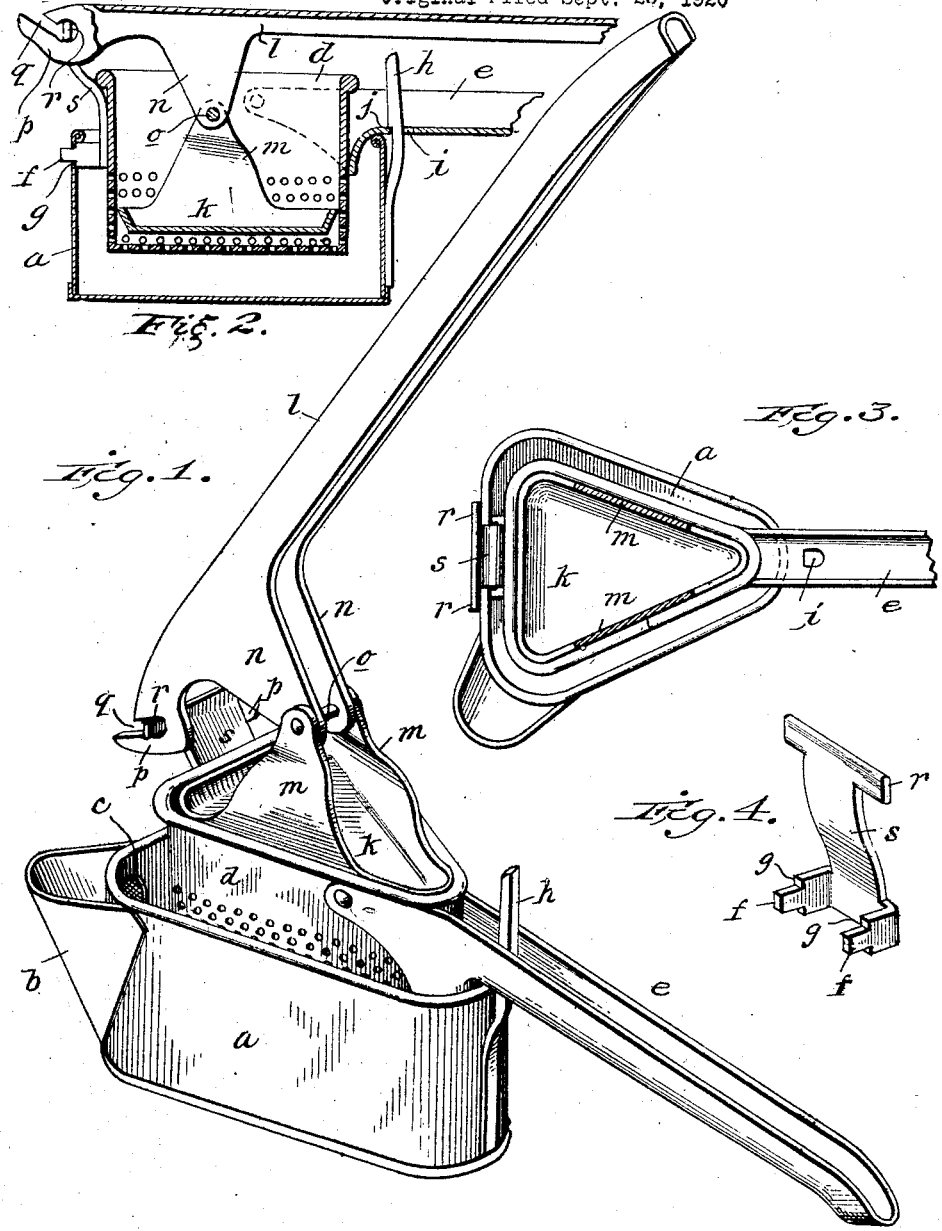

Patented June 16, 1925.

1,542,322

UNITED STATES PATENT OFFICE.

MICHAEL A. ROLLMAN, OF MOUNT JOY, PENNSYLVANIA.

COMBINATION FRUIT PRESS, POTATO MASHER, AND STRAINER.

Application filed September 23, 1920, Serial No. 412,143. Renewed December 10, 1924.

*To all whom it may concern:*

Be it known that I, MICHAEL A. ROLLMAN, a citizen of the United States of America, and a resident of Mount Joy, county of Lancaster, and State of Pennsylvania, have invented certain new and useful Improvements in a Combination Fruit Press, Potato Masher, and Strainer, of which the following is a full and clear specification.

The object of this invention is to provide in a single culinary utensil a combined potato masher or ricer, a fruit press and a strainer, and the invention consists of certain novel features of construction in combination with the parts hereinafter described and claimed.

In the drawing—

Fig. 1 is a perspective view of my implement, showing it adapted to be used as a fruit press;

Fig. 2 is a vertical sectional view of the same;

Fig. 3 is a plan view partly in horizontal section.

Fig. 4 is a detail perspective view of the bearing bracket.

In the drawing annexed, $a$ designates a main cup-like vessel which is desirably triangular in horizontal section and which is provided at one of its rear corners with a pouring spout $b$, a strainer $c$ being provided in the wall of the vessel in such position as to communicate with the spout. This vessel has its top open and is not provided with a handle, so that when the other parts of the device are removed from it, it may be used as an ordinary tin cup or strainer.

Mounted within the cup $a$ is a hopper $d$ open at its top and having its bottom wall as well as its side walls perforated and being triangular in horizontal section to conform to the shape of the main cup. This hopper is supported at a distance above the bottom of the main cup, and it is sufficiently smaller than the main cup to provide a space all around its three walls. This hopper is supported within the cup by means of a handle $e$ at its front side and by means of a pair of pins $f$ at its rear side, these pins entering a pair of holes in the rear wall of the main cup and being properly positioned therein by means of shoulders $g$ formed on the pins, which shoulders abut against the rear wall of the cup. The handle $e$ is affixed rigidly to the hopper and rests upon the upper edge of the main cup, at the apex of its front side. The hopper is detachably locked within the cup by means of a latch $h$ fastened to the front end of the main cup and extending up through a hole $i$ in the handle, the upstanding part being a spring and being provided with a shoulder at $j$ to engage the handle and thus lock the hopper in the cup. The upstanding part of the latch is in convenient position for engagement by the finger of the user when it is desired to disconnect the hopper from the cup, this being done by simply pressing the upper end of the latch forwardly to release its shoulder $j$ from the handle. The handle $e$ is formed of sheet metal, its forward end being bifurcated and bent so as to fit against and around the forward tapered end of the hopper, this form of hopper lending itself nicely to this simple and effective way of fastening the handle thereto.

A plunger $k$ is arranged in the hopper and is adapted to be moved up and down by means of a handle $l$ pivotally mounted on the hopper. The plunger consists of a substantially triangular plate of sheet metal having its edges bent upwardly, two of the opposite edges being extended upwardly sufficiently to form a pair of ears $m$ for connection to the depending ears $n$ formed on the handle $l$, these ears being connected pivotally by means of a horizontal pivot $o$. This pivotal connection is a loose one, so that the plunger always hangs in a horizontal position in the hopper.

The lever $l$ is formed of sheet metal, its rear end being bifurcated to form two rearwardly-extending arms $p$ which are provided with slots $q$ opening upwardly and rearwardly for detachable engagement with a pair of oppositely-extending pivots $r$ mounted above and to the rear of the hopper, these pivots being rigidly secured to the hopper by means of a supporting plate $s$ rigidly fastened to the rear wall of the hopper and carrying at its lower end, integrally, the aforesaid supporting pins $f$.

As a fruit press, it will be observed that the fruit is placed in the hopper, then the lever $l$ is forced downwardly to squeeze the fruit between the plunger and the perforated bottom and side walls of the hopper, the cup catching the juice and enabling it to be strained when poured out through the strainer-spout $b$. In manipulating the utensil in thus pouring out the pressed juice, the utensil is handled by taking hold of the two handles *e* and *l* which, when the plunger is down, lie substantially parallel and sufficiently close together to be grasped in one hand.

The fruit-pressing mechanism may be removed, as heretofore stated, by simply unlatching the latch *h* and lifting the implement off the cup, when the cup may be used alone as an ordinary strainer, and the removed mechanism may be used for mashing or ricing potatoes. A further conversion of the implement may be made by removing the plunger and its operating lever *l* from the hopper, this being done by simply slipping the handle *l* off the pivots *r*, the slots *q* permitting this to be readily done. When the plunger and its handle are thus disconnected from the hopper, the hopper may then be used as an ordinary dipper-like strainer.

It is desirable, as stated, to have the cup and the hopper triangular in form. This is desirable for a number of reasons. It provides at one of the rear corners of the cup or main vessel a handy spout, and the rear straight walls both of the cup and the hopper afford a substantial support for the pins *f* and the pivots *r*.

The nature and scope of the invention having been thus indicated and its preferred embodiment having been specifically described, what is claimed as new is:

1. As a new article of manufacture, a culinary utensil combining in one a fruit press, potato ricer and strainer embodying a two-part handle, a perforated hopper, and an imperforate detachable cup having a bearing on the lower member of said handle.

2. As a new article of manufacture, a culinary utensil combining in one a fruit press, potato ricer and strainer embodying a main cup, a perforated hopper provided with a handle and detachably mounted within the cup, and a lever mounted detachably on the hopper and carrying a plunger adapted to work in said hopper.

3. As a new article of manufacture, a culinary utensil combining in one a fruit press, potato ricer and strainer, said utensil embodying a cup and a hopper detachably mounted therein, both the cup and the hopper being triangular in horizontal section and one of the rear corners of the cup being provided with a strainer spout.

4. A utensil consisting of a cup and a handled hopper having a perforated bottom, means being provided for supporting the hopper within the cup and a latch being provided for locking it therein, and a plunger adapted to work in the hopper while it is mounted within the cup.

5. A utensil combining a main cup, a hopper detachably supported therein and provided with strainer openings and with a handle, means for supporting and latching the hopper within the cup, said means embodying a latch at the front end of the cup, a pair of supporting pins attached to the rear end of the hopper and adapted to engage holes in the wall of the cup, and a plunger and lever mounted on the hopper and detachable therefrom.

6. A culinary utensil embodying a perforated hopper having rigidly attached thereto one member of a two-part handle, another member of said two-part handle pivotally mounted on the hopper and carrying a plunger adapted to work in the hopper, and an imperforate cup surrounding the lower part of the hopper and detachably latched thereto.

7. A culinary utensil combining a perforated hopper, a lever pivotally mounted on the back wall thereof and extending forwardly and carrying a plunger, said hopper being provided also with a forwardly-extending rigid handle-member, and an imperforate cup surrounding the lower part of the hopper and provided with a latch engaging said rigid handle-member, means being provided for detachably locking the rear wall of said imperforate cup to the rear wall of the hopper.

In testimony whereof I hereunto affix my signature.

MICHAEL A. ROLLMAN.